(No Model.)

F. KOMPST.
ADJUSTABLE DEVICE FOR HOLDING RECEPTACLES FIRMLY ON SUPPORTS.

No. 467,419. Patented Jan. 19, 1892.

Witnesses

Inventor
F. Kompst.
By his Attorneys Higdon & Higdon

THE NORRIS PETERS CO., PHOTO-LITHO., WASHINGTON, D. C.

UNITED STATES PATENT OFFICE.

FRIEDRICK KOMPST, OF ST. LOUIS, MISSOURI.

ADJUSTABLE DEVICE FOR HOLDING RECEPTACLES FIRMLY ON SUPPORTS.

SPECIFICATION forming part of Letters Patent No. 467,419, dated January 19, 1892.

Application filed March 27, 1891. Serial No. 386,676. (No model.)

*To all whom it may concern:*

Be it known that I, FRIEDRICK KOMPST, of the city of St. Louis, State of Missouri, have invented certain new and useful Improvements in an Adjustable Device for Holding Receptacles Firmly on Supports, of which the following is a full, clear, and exact description, reference being had to the accompanying drawings, forming a part hereof.

My invention relates to improvements in adjustable devices for holding receptacles firmly on supports; and it consists in the novel arrangement and combination of parts, as will be more fully hereinafter described and designated in the claims.

Figure 1:
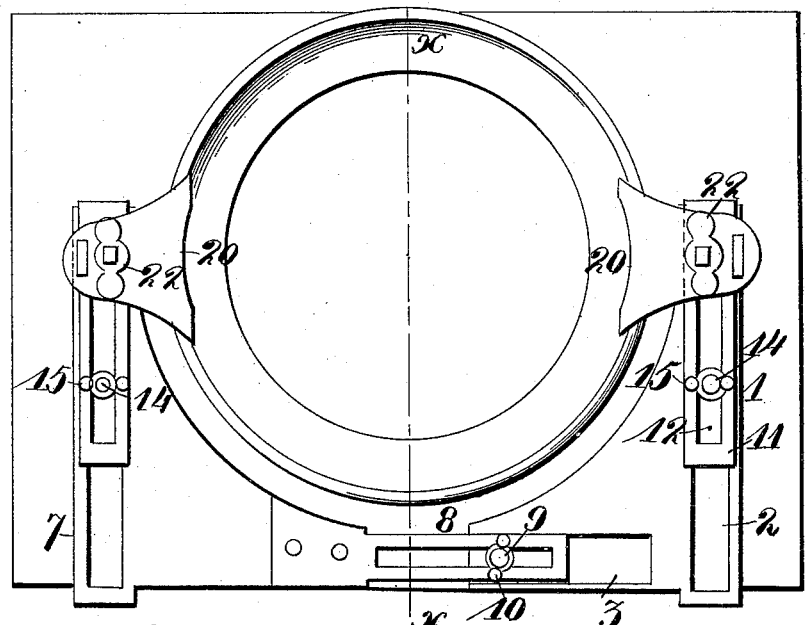
Figure 2:
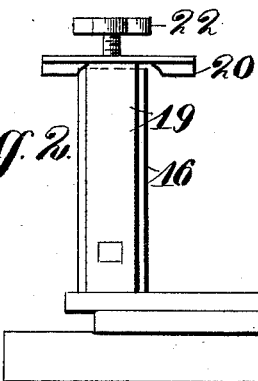
Figure 3:
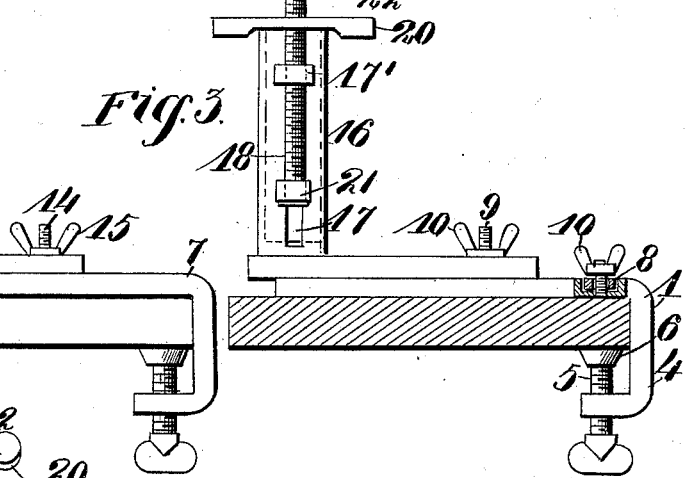
Figure 4:
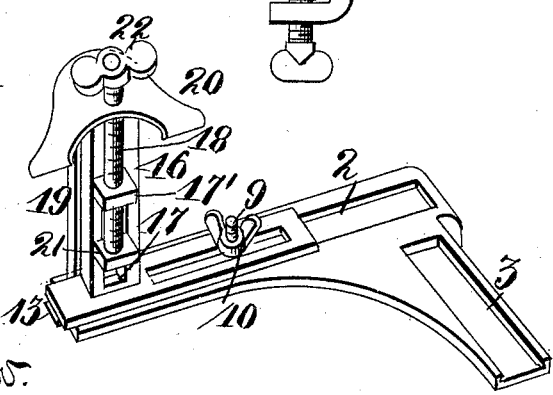

In the drawings, Figure 1 is a top plan view of my invention as applied to a receptacle, such as a dish-pan. Fig. 2 is a side elevation of the same. Fig. 3 is a vertical section taken on the line *x x* of Fig. 2, and Fig. 4 is a detail view of one of the adjustable right-angled sections detached with its attachments.

The object of my invention is to construct a device for holding receptacles firmly on a support, and is especially designed to be used in connection with kitchen utensils—for instance, for holding a dish-pan or any other similar receptacle in a firm position on the table—and is especially designed to be adjustable to hold various sizes of receptacles.

My invention is adapted to be adjusted to suit a receptacle of any depth and diameter as desired.

Referring to the drawings, 1 indicates a right-angled section, the inner surface of the same being curved so as to fit the contour of a receptacle. Said section is provided with a longitudinal dovetailed groove 2 and also with a transverse groove 3, the same being arranged at right angles to each other, as shown in Fig. 1. Said section is also provided with a U-shaped attachment 4, the same being adapted to fit over the edge of a table or any suitable support, and is also provided with a screw-threaded perforation, in which a thumb-screw 5 is adapted to be inserted for holding said section firmly to the table.

6 indicates a lug, which is loosely secured to the end of said thumb-screw, the same being adapted to be clamped by the agency of said thumb-screw to the table or support.

7 indicates a similar section, the same being provided with a similar longitudinal dovetail groove and with a similar U-shaped attachment, as section 1, and is additionally provided with a slotted projection 8, the same being adapted to freely move in groove 3, as shown in Fig. 1. Section 1 is provided with a screw-threaded stem 9, the same being adapted to be easily inserted in the slot of the slotted projection 8.

10 indicates a clamp, which is adapted to be screwed on said screw-threaded stem 9 for clamping projection 8 in groove 3 whenever desired.

From the construction, as hereinbefore stated, it can be readily perceived that section 7 is adjustable to and from section 1, so as to admit between said sections and their attachments various sizes of receptacles.

11 indicates two sliding plates, which carry adjustable standards; but as the mechanical construction of both is the same I will only proceed to describe one, from which description the construction of the other can be easily deduced. Said sliding plate 11 is provided with a longitudinal slot 12 and also a dovetail projection 13, which projection is adapted to move in the dovetail longitudinal groove 2 in a forward and rearward direction from the operator.

Sections 1 and 7 are provided with screw-threaded stems 14, similar to the screw-threaded stem 9, and on said stem clamps 15 are adapted to be screwed upon for holding said plate or plates in the desired adjustment to sections 1 and 7. Secured to each of said plates 11 are standards 16, the same being provided with vertical slots 17, and said standards are additionally provided with screw-threaded projections 17', in which projections vertical screw-threaded shafts 18 are adapted to be inserted. Said standards 16 are provided or may be provided with grooves on their exterior faces, in which adjustable plates 19 are free to move in a vertical direction. Said plates 19 are provided with hooked plates 20, the same being secured to the top of adjustable plates 19 and adapted to fit over the edge of the receptacle. Said plates 19 are provided with perforated lugs 21, in which the lower end of the vertical shafts 18 are adapted to loosely fit. The hooked plates 20 are provided with perforations, in which the vertical shafts 18 may be inserted. Said shafts are provided with shoulders, so that when they are inserted in their appropriate perforations formed in the hooked plates 20 they are rendered immovable in a vertical direction, but free to move revolubly. Said shafts 18 are provided with handles 22 by which the same may be rotated.

By the construction as herein set forth it can be readily perceived that by the operation of shafts 18 the sliding plates 19, and consequently the hooked plates 20, secured to the same, may be adjusted in a vertical direction, as desired, in order to accommodate receptacles of various depths.

Having fully described my invention, what I claim is—

1. The herein-described device for holding receptacles, consisting of two main plates adapted to be clamped to a table-top, adjustable connections between the same, laterally-adjustable extensions upon each of said plates, and vertically-adjustable clamps carried by said extensions, adapted to pass over the upper edge of the receptacle and hold the latter down, substantially as described.

2. In a device for holding receptacles firmly on supports, two quadrant-shaped plates adapted to be clamped to a support, a slotted tongue on one of said plates, the opposite plate being provided with a groove in its upper surface for the reception of said tongue, a thumb-screw for securing the plates together, and vertically-adjustable clamping devices carried by the main plates, substantially as described.

3. In a device for holding receptacles firmly on supports, two main quadrant-shaped plates provided with dovetailed slots, means for connecting the same, extension-plates provided with dovetailed projections on their lower side, adapted to operate in the grooves in the main plates, and vertically-adjustable clamping devices carried by said extension-plates, substantially as described.

4. A device for holding receptacles firmly on supports, consisting of a section 1, a section 2, adjustable on said section to and from the same, said sections being provided with U-shaped attachments 4, in which thumb-screws may be inserted for holding said sections firmly to a support, adjustable sliding plates 11, mounted on said sections 1 and 7, vertical standards 16, secured to said sliding plates 11, vertical adjustable plates 19, provided with hooked plates 20, mounted on said plates 19 and free to move in a vertical direction upwardly and downwardly on the same, and vertical screw-threaded shafts 18 for effecting said vertical movement upwardly and downwardly of plates 19, and consequently plates 20, substantially as set forth.

5. The herein-described adjustable device for holding receptacles firmly on supports, having a sliding plate 11, a standard 16, secured to the same, an adjustable plate 19, provided with a hook 20, mounted on said standard, and a screw-threaded shaft 18 for moving said plate vertically, upwardly, and downwardly upon said standard, substantially as set forth.

In testimony whereof I affix my signature in presence of two witnesses.

FRIEDRICK KOMPST.

Witnesses:
E. E. LONGAN,
C. P. KELLER.